United States Patent [19]
Brown

[11] 3,826,273
[45] July 30, 1974

[54] PRESSURE LOSS COMPENSATOR

[75] Inventor: Albert William Brown, Newport Beach, Calif.

[73] Assignee: International Telephone and Telegraph Corporation, New York, N.Y.

[22] Filed: Mar. 26, 1973

[21] Appl. No.: 344,708

[52] U.S. Cl................... 137/1, 137/486, 417/151
[51] Int. Cl............................................. F16k 31/12
[58] Field of Search.................... 137/485, 486, 502; 417/151, 183, 179, 197

[56] References Cited
UNITED STATES PATENTS

| | | | |
|---|---|---|---|
| 409,046 | 8/1889 | Lange | 417/183 |
| 445,831 | 2/1891 | Desmond | 417/183 |
| 461,197 | 10/1891 | Hart | 417/183 |
| 857,768 | 6/1907 | Stirling | 417/197 |
| 2,025,577 | 12/1935 | Piehl | 417/183 X |
| 2,921,319 | 1/1960 | Kivela | 417/197 X |
| 3,021,859 | 2/1962 | Liantonio et al. | 137/502 X |

FOREIGN PATENTS OR APPLICATIONS

| | | | |
|---|---|---|---|
| 613,144 | 1/1961 | Canada | 417/197 |
| 887,089 | 1/1962 | Great Britain | 137/502 |

*Primary Examiner*—Henry T. Klinksiek
*Attorney, Agent, or Firm*—Thomas L. Peterson

[57] ABSTRACT

A main venturi creating a small pressure drop in its throat is positioned in a high pressure fuel line for fueling aircraft. A small amplifying venturi with means for adjusting the flow therethrough is positioned with its input connected to the line pressure while its outlet is in communication with the throat of the main venturi. The throat of the adjustable venturi is connected to a regulator at a fueling station controlling the fuel line pressure, the amplifying venturi is selected and adjusted to compensate for a pressure drop in the fuel line downstream of the main venturi.

22 Claims, 2 Drawing Figures

PATENTED JUL 30 1974 3,826,273

PRESSURE LOSS COMPENSATOR

BACKGROUND OF THE INVENTION

This invention relates to an improved arrangement for compensating for frictional pressure loss in a fluid flow line, and more particularly to such a compensator for use in a system for fueling aircraft.

A common system for fueling aircraft at an airport includes a plurality of fixed stations at which fuel may be withdrawn from a fueling hydrant. The stations are located for example at parking places where aircraft may be fueled. Each of these stations is typically connected by an underground piping system to a fluid supply tank and a pump which maintains fluid pressure in the entire system. A pressure control valve or regulator is mounted at each hydrant or is movable with a flexible hose which ducts the fuel to the fuel tank of an aircraft. This control valve is responsive to the pressure in a control line to regulate the flow of fuel from the hydrant.

Even though the aircraft is parked near the fueling station, because of the size of the aircraft it is often a considerable distance between the hydrant and the connection to the aircraft fuel tank. Thus, frequently a fueling vehicle or truck is connected in the hose leading to the aircraft fuel tank, with the vehicle being used to store and transport the hose, and to monitor and regulate the fuel flow. This also permits the use of a single large diameter hose between the hydrant and the truck and more than one smaller diameter and longer hoses to be mounted on reels on the truck so that more than one aircraft tank can be filled at one time. All of the hoses and preferably the pressure regulator are conveniently moved by the truck from station to station.

Because of the sometimes considerable length between the hydrant and the tank and because of the high flow rates involved there is significant frictional pressure loss from the regulator to the tank. Thus it is common to include in the fuel truck an apparatus which is connected to the control line and compensates for the hose pressure loss. It is easy to compensate for the pressure loss between the hydrant and the truck by simply coupling the control line to the main flow line at the truck and thus sensing the pressure at the truck and transmitting a suitable signal back to the regulator at the hydrant. However, compensation must also be provided for the loss between the truck and the aircraft. Since the pressure loss varies with the flow rate, it is necessary that the compensation arrangement be responsive to the flow rate also. The pressure could of course be sensed at the coupling to the airplane fuel tank, but this would require a pressure sensing line throughout the entire hose length, and, one sensing line for each hose.

In one known compensation arrangement, a venturi is positioned in the fuel line at the fuel truck, with the venturi throat pressure being applied to the control line connected to the regulator at the hydrant. The anticipated hose pressure loss between the truck and the aircraft is calculated or otherwise determined, and the diameter of the venturi throat is selected to reduce the pressure at the throat an amount sufficient to provide the same loss. The regulator at the hydrant opens to increase hose pressure as the throat pressure decreases. Such a system is responsive to the flow rate through the hose in that friction loss increases as flow increases and the venturi throat pressure decreases as flow rate increases.

One shortcoming of the prior art arrangement described above is that relatively high pressure drops are common for aircraft fuel lines and hence to provide a low enough compensating pressure at the venturi throat (causing the regulator to increase hose pressure), it is necessary to utilize a throat diameter which is considerably smaller than the diameter of the hose. A venturi with a relatively high ratio between the unrestricted diameter and the throat diameter will itself produce a significant pressure loss across the venturi. For example with the pressure at the inlet of the venturi in the area of 100 p.s.i. and the pressure at the throat of about 50 p.s.i. to compensate for a 40 p.s.i. pressure drop in the hose between the truck and the aircraft, the pressure at the outlet of the venturi might be about 93 p.s.i. with a flow rate of 300 gallons per minute. Or in other words, the line pressure loss across the venturi was 7 p.s.i. at that flow rate. Because of the tremendous quantities of fuel required by large modern day aircraft, it is important that all pressure losses be minimized so that the aircraft can be fueled as quickly as possible, and thus minimize the downtime of the aircraft.

SUMMARY OF THE INVENTION

In accordance with this invention, an arrangement is provided that greatly reduces the pressure loss introduced by the pressure compensating means. This is accomplished by an arrangement which permits using a venturi in the fuel line which has a throat diameter which causes only a relatively small pressure loss across the venturi. For example, using the figures mentioned above in connection with the prior art system, the pressure drop across the venturi at 300 gallons per minute would only be from 1 to 2 p.s.i. compared to 7 p.s.i. of the prior art arrangement.

To provide the necessary compensation, an amplifying venturi is positioned with its inlet connected to bleed a small flow from the hose pressure, such as at the inlet to the main venturi in the fuel line, and the outlet of the amplifying venturi is connected to the throat of the main venturi. The throat pressure of the amplifying venturi is the compensating pressure which is connected to the pressure regulator back at the hydrant of the fueling station. The amplifying venturi may be selected to provide whatever pressure drop at the throat that is decided. The amplifying venturi will operate on a small pressure differential between its inlet and outlet. Thus, the restriction in the main venturi need not be very great to produce the pressure differential needed to operate the amplifying venturi, which in turn results in the small pressure loss across the venturi. The pressure loss in the main line because of the amplifying venturi is not significant because of the small flow through the amplifying venturi.

It should be noted that the small pressure drop required to operate the amplifying venturi need not be provided by a main venturi in the fuel line. Instead this pressure drop could be caused by some other element in the fuel line that might produce the relatively small pressure drop required to create the necessary pressure differential across the amplifying venturi, so long as the pressure drop is proportional to flow rate.

Pressure loss characteristics vary as a hose wears and hoses of varying lengths may be used between the fuel truck and the aircraft. To accommodate such changes, the amplifying venturi is provided with a valve member for controlling or adjusting the flow through the amplifying venturi.

Another advantage of the invention is its compact construction. The main venturi to be added to the fuel line is provided with a supporting flange which is simply clamped between two flanges formed on a coupling in the main flow line. The amplifying venturi is relatively small and is positioned within a radial passage in the supporting flange. This also facilitates installation and removal of the amplifying venturi.

DESCRIPTION OF A PREFERRED EMBODIMENT

For a more thorough understanding of the invention, refer to the following detailed description and drawings in which.

Figure 1:
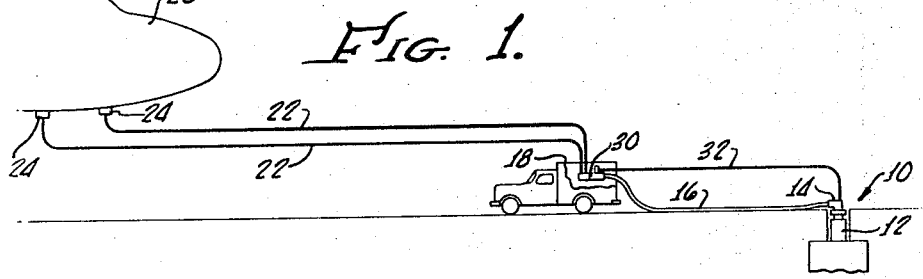
FIG. 1 is a schematic view of an aircraft fueling system.

Referring first to FIG. 1 there is illustrated an aircraft fueling station 10 including a hydrant 12 and a pressure control valve or regulator 14 attached to the hydrant. A fuel line or hose 16 extends to a fuel truck or cart 18 which stores and transports a quantity of hose and controls the fueling operation. One or more hoses 22, which may be conveniently stored on reels (not shown) extend from the cart to a fitting 24 connected to the aircraft fuel tank in the aircraft 20.

Within the truck 18, the fuel line may include a filter and a meter (not shown) plus a pressure loss compensator 30 of the invention. A control or compensating pressure line or tube 32 extends from the compensator 30 to the regulator 14 at the hydrant 12.

The pressure applied to the regulator 14 through the control line 32 is balanced against a reference pressure within the regulator. The reference pressure may be provided by an air source (not shown) which may conveniently be positioned in the fuel truck 18, with an air hose (not shown) extending to the regulator. The regulator is constructed such that an increase in the compensating line pressure decreases the main fuel line pressure. An example of a regulator which would decrease main line pressure upon an increase in a compensating line pressure is shown in U.S. Pat. No. 3,500,864.

Figure 2:
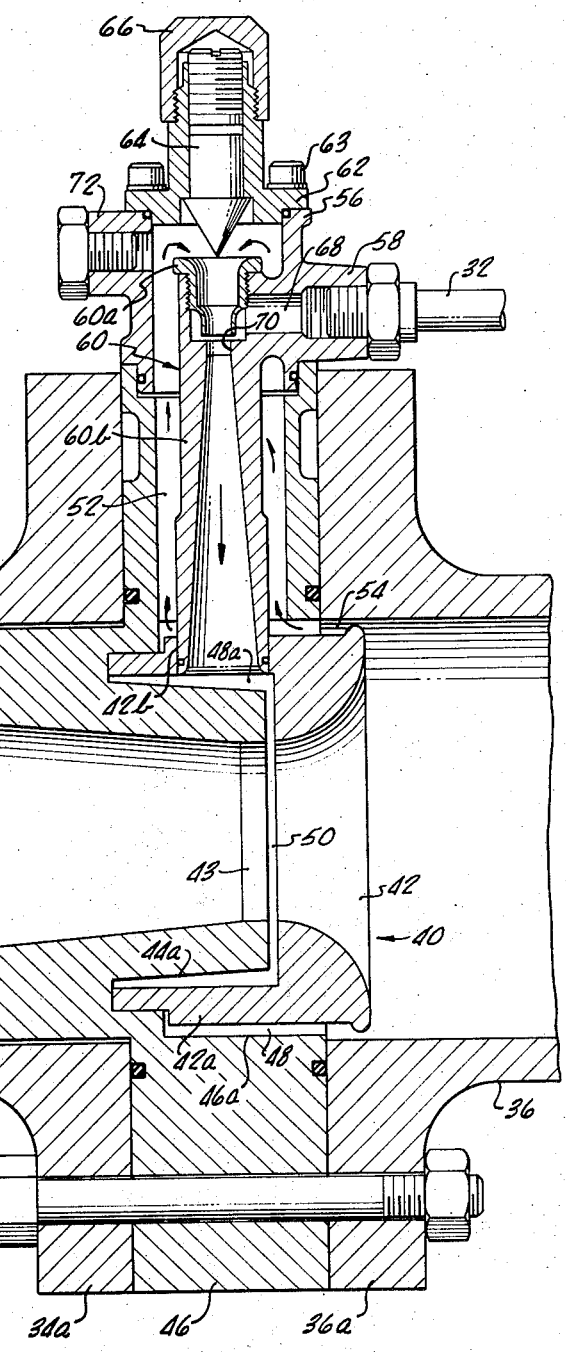
FIG. 2 is a cross-sectional view of the pressure loss compensator of the invention.

Refer now to FIG. 2 for a description of the compensator 30. As can be seen, a coupling is formed in the main fuel line including two cylindrical portions 34 and 36 having radially extending flanges 34a and 36a clamped together by a series of bolts 38. Positioned within the coupling is a main venturi 40 having a wide-mouth inlet portion 42 which tapers to a restriction or throat 43 formed on the upstream end of an elongated outlet portion 44 of the venturi. The outlet portion 44 tapers smoothly outwardly from the throat 43 in a manner to minimize turbulence within the fuel line, as is conventional in venturi design. The outlet portion has a radially extending flange 46 which is clamped between the flanges 34a and 36a of the coupling. The inlet portion 42 includes a cylindrical section 42a which fits within an annular socket 48 in the outlet portion formed by the wall 44a and the inner wall 46a of the flange 46. The downstream end of the cylindrical section 42a of the inlet portion is secured to the base of the socket 48. The upstream end of the outlet portion adjacent the throat 43 and the downstream end of inlet portion 42 adjacent the throat 43 are spaced slightly to form an annular gap 50. This gap in turn communicates with the annular space 48a defined by the cylindrical inner wall of the inlet section 42a of the venturi and the outwardly extending wall 44a of the outlet portion 44 of the venturi.

A radially extending passage 52 is formed in the flange 46 of the outlet portion 44 of the main venturi 40. The radially inner end of the passage 52 opens to an annular space 54 between the outer periphery of the inlet portion 42 of the main venturi and the surrounding cylindrical wall of the coupling portion 36. This space is open to the upstream fuel line pressure in view of the fact that the upstream end of the venturi inlet portion 42 is spaced slightly from the surrounding wall of the coupling member 36.

Attached to the venturi flange 46 is a cylindrical fitting 56 forming an extension of the passage 52. A supporting strut 58 attached to the wall of the fitting 56 supports an amplifying venturi 60 which extends within the fitting and the passage 52, the venturi being spaced from the surrounding fitting and the passage walls. The inlet end 60a of the venturi 60 is located in the cylindrical fitting 56 and is thus in communication with the upstream fuel line pressure by way of the radial passage 52 and the space 54.

A cap 62 encloses the radially outer end of the cylindrical fitting 56, being secured thereto by a plurality of bolts 63 or other suitable fastening means. An axially adjustable valve member 64 is threadably mounted in the cap and is movable toward and away from the entry end 60a of the amplifying venturi 60. In effect the mouth or entry to the venturi forms a valve seat for the valve member 64. Consequently, the flow through the venturi 60 is adjustable by axially moving the valve member. Access to the outer end of the valve member 64 is controlled by a closure cap 66.

The downstream or outlet end 60b of the amplifying venturi 60 is positioned within a radially extending port 42b formed in the cylindrical section 42a of the inlet portion 42 of the main venturi 40. As can be seen, the outlet end 60b of the amplifying venturi 60 is in communication with the throat 43 of the main venturi 40 by way of the annular space 48a and the gap 50 between the inlet and outlet portions of the main venturi.

The strut 58 supporting the amplifying venturi 60 includes a compensator pressure port 68, the inner end of which is in communication with the throat 70 of the compensating venturi. The outer end of the port is connected to the control line 32 which leads to the primary regulator 14 at the hydrant 12 in the airport fueling station 10 shown in FIG. 1. The amplifying venturi 60 is formed in two parts, a main body portion 60b which includes the downstream or outlet portion and the inlet portion 60a which is threaded into the main body portion. As can be seen, the downstream or throat end of the inlet portion 60a is spaced slightly from the restriction or throat 70 in the main body portion of the amplifying venturi so that the pressure port 68 is in communication with the throat pressure of the amplifying venturi. Also, to obtain uniform sensing the downstream end of the inlet portion 60a is spaced inwardly from a surrounding annular or cylindrical wall in the main body portion 60b so that the compensating port 68 senses an accurate pressure reading for the amplifying venturi throat 70.

Also positioned in the wall of the cylindrical fitting is a plug 72 closing a test port which can be utilized to test the pressure at the input to the amplifying venturi.

It should be noted that the amplifying venturi 60 is conveniently formed as a single assembly mounted on the cylindrical fitting 56. That is, by disconnecting the cylindrical fitting from the flange on the main venturi, the entire amplifying venturi can be removed. This lends compactness to the design as well as ease of servicing and maintenance.

From the foregoing description the operation of the compensator 30 is probably readily apparent, however, it will be briefly summarized. The main venturi 40 is designed such that its throat diameter is only small enough to create a sufficient pressure drop from the upstream pressure adequate to operate the amplifying venturi, and the necessary compensating pressure is obtained from the small flow through the amplifying venturi 60. For example, in one workable form of the invention the main venturi 40 has a throat pressure 8 psi less than the inlet line pressure. This pressure differential is adequate to cause a significant flow to pass into the radial passage 52 and through the amplifying venturi 60 and back into the throat 43 of the main venturi 40. It has been found that a restriction in the main venturi sufficient to cause an 8 psi differential produces a pressure loss across the main venturi 40 of only about a 1 to 2 psi at a flow rate of 300 gallons per minute. Such a pressure loss is considerably less than prior art single venturi pressure compensating systems wherein a pressure drop at the throat of 40 to 50 psi is required, with the result that the loss across the venturi is much greater.

The amplifying venturi 60 may be constructed to provide whatever pressure drop is desired at its throat. The drop by amplifying venturi is of course usually much greater than the main venturi, and therefore the ratio of inlet diameter to throat diameter is much greater for the amplifying venturi than for the venturi in the main line. The small flow through the amplifying venturi does not result in a significant pressure loss across the main venturi 40. With a fuel line pressure in the area of 100 psi, a hose pressure loss from the fuel truck 18 to the plane may typically be 40 psi at flow rates of 300. To compensate for this it is desirable to have a pressure drop at the throat of the amplifying venturi of about 40 psi plus an allowance for frictional losses through the compensator. Thus, the throat in the amplifying venturi is selected to provide such a pressure drop. As stated above, the regulator at the hydrant 12 is constructed such that a decrease in the compensating line pressure increases the main line pressure, thus compensating for pressure drop from the truck to the airplane as well as the loss from the hydrant to the truck With low flow rates through the main fuel line, the hose pressure loss is less, such that a smaller compensating pressure drop is required and this automatically occurs with the amplifying venturi. With high flow rates, hose pressure loss is high; but the higher the flow rate through the amplifying venturi, the greater the pressure drop across the amplifying venturi. This in turn causes the regulator to compensate line pressure accordingly.

The frictional losses occurring in the hose 22 between the truck 18 and the aircraft will change somewhat as the hose wears. Also different lengths of hose 22 may be utilized. The pressure to the amplifying venturi is made adjustable to accommodate this. The amplifying venturi throat diameter is selected to provide the largest expected compensating pressure drop required. To reduce the pressure drop, the inlet pressure to the amplifying venturi is reduced by way of the adjusting valve member.

It should be noted that the amplifying venturi merely responds to a pressure differential between its inlet and its outlet. It will respond in a predictable fashion regardless of the cause for this differential. In the arrangement shown this pressure drop is conveniently caused by the main venturi. However, it is possible that the pressure drop could be created by some other means such as some other restriction in the main fuel line.

What is claimed is:

1. A method of compensating for pressure loss in a fluid flow line downstream from a pressure sensing point comprising the steps of:
   positioning means in the line to create a pressure drop responsive to flow rate;
   bypassing a sample portion of the flow around said means creating the pressure drop and through an amplifying venturi; and
   connecting the pressure at the throat of the amplifying venturi to a pressure regulator which regulates the line pressure in a manner such that an increase in throat pressure of the amplifying venturi decreases the pressure in the flow line.

2. The method of claim 1 wherein the means for creating the pressure drop in the main line is the throat of a venturi positioned in the main line.

3. In an aircraft fueling system having a fixed fuel storage station with an outlet hydrant and a pressure regulator, a fuel hose extending from the regulator to a fuel truck, and a fuel hose extending from the truck to an aircraft fuel tank, a method of compensating for pressure loss in the fuel hoses comprising the steps of:

passing the fuel through a venturi in the fuel truck;

bypassing a sample portion of the fuel flow from the hose and passing it through an amplifying venturi having its outlet connected to the throat of the venturi in the hose; and
   connecting the pressure at the throat of the amplifying venturi to the pressure regulator, which regulates the hose pressure in a manner such that a decrease in throat pressure of the amplifying venturi increases the pressure in the hose, the throat of the amplifying venturi being selected to compensate for the hose loss between the truck and the aircraft fuel tank.

4. The method of claim 3 including the step of adjusting the flow through the amplifying venturi to be able to compensate for pressure losses introduced by different characteristics of the hose extending between the truck and the aircraft fuel tank.

5. A pressure loss compensator for a fluid flow line comprising:
   means creating a pressure drop in the flow line which is responsive to flow rate;
   a venturi to amplify the pressure drop connected to bypass a portion of the flow from the fluid flow line around the means creating the pressure drop; and means for connecting the throat pressure of the amplifying venturi to means for regulating pressure in the line, the venturi being constructed so that its throat reduces pressure sufficiently to compensate for a pressure loss which occurs downstream from said means creating said pressure drop.

6. The compensator of claim 5 including an adjustable valve member mounted to control the flow through the amplifying venturi so as to adjust the venturi to compensate for different downstream pressure losses.

7. The compensator of claim 5 wherein said means for creating the pressure drop is the throat of a main venturi positioned in the fluid flow line.

8. The compensator of claim 7 wherein the ratio of the main venturi inlet diameter to its throat diameter is smaller than the ratio of the amplifying venturi inlet diameter to its throat diameter.

9. The compensator of claim 7 wherein the venturi in the main flow line has a supporting flange which is clamped between the flanges of a coupling in the flow line, and amplifying venturi extends radially outwardly from the throat of the main venturi through a passage in the supporting flange.

10. The compensator of claim 9 wherein said amplifying venturi is spaced from the walls of said passage, the inlet to the amplifying venturi is in communication with said passage, and the fluid upstream of the main venturi is in communication with said passage.

11. A pressure loss compensator comprising:
a main venturi having a supporting flange extending radially outwardly from the throat area of the venturi;
a radially extending passage formed in said flange; and
an amplifying venturi extending into said passage with the inlet of the amplifying venturi being open to the passage and the outlet of the amplifying venturi being in communication with the throat of the main venturi.

12. The compensator of claim 11 including:
means for connecting the throat of the amplifying venturi to a regulator for regulating fluid flow through the main venturi, the amplifying venturi being designed such that its throat pressure will compensate for a pressure loss which will occur downstream from the main venturi.

13. The compensator of claim 11 wherein said main venturi is positioned within a fluid flow line with the supporting flange being clamped between two flanges of a coupling in the fluid flow line.

14. The compensator of claim 13 wherein the inlet to the main venturi is spaced slightly from the surrounding flow line to create an annular space which is in communication with the radial passage extending through the supporting flange of the main venturi whereby the pressure in the flow line at the entry to the main venturi is in communication with the entry to the amplifying venturi.

15. The compensator of claim 14 including a cylindrical fitting forming an extension of the radially extending passage in the supporting flange, the inlet portion and the throat portion of the amplifying venturi extending into said fitting, a strut attached to the inner wall of the fitting and attached to the amplifying venturi for supporting the amplifying venturi within the radially extending passage, and a port in said strut in communication with the pressure at the throat of the amplifying venturi and extending through the strut for communication with a regulator for regulating fluid flow through the main venturi.

16. The compensator of claim 14 including a cap enclosing the end of said cylindrical fitting, and a valve member adjustably supported in said cap for controlling the flow of fluid through the amplifying venturi.

17. The compensator of claim 11 including a fluid flow line in which the main venturi is positioned, said passage in the main venturi being in communication with the flow line adjacent the main venturi; a pressure regulator positioned in the flow line upstream of the main venturi; and a compensating pressure line connecting the throat of the amplifying venturi to said regulator in a manner to control line pressure downstream from the regulator, the throat of the amplifying venturi being designed to compensate for pressure loss downstream from the main venturi.

18. Apparatus comprising:
a fluid flow line;
a venturi having support means for mounting the venturi in the flow line;
means forming a passage in the support means;
fluid communicating means defined at least in part by the venturi for sensing flow line pressure in said passage; and
fluid communication means connected to the venturi throat and extending into said support means for sensing throat pressure through said support means.

19. The apparatus of claim 18 wherein said fluid communication means connected to the venturi throat extends into said passage.

20. The apparatus of claim 18 wherein said means providing communication between the line pressure and said passage is provided by spacing the inlet portion of the venturi from the surrounding flow line to create an annular space which is in communication with the passage.

21. The apparatus of claim 18 wherein said support means surrounds the throat area of the venturi.

22. The apparatus of claim 18 wherein said fluid communication means connected to said venturi includes a second venturi intending into said passage with one end connected to the throat pressure of the first mentioned venturi and with its other end opening to said passage.

* * * * *